Feb. 16, 1943.   N. ERICSON   2,311,331
MEANS FOR MEASURING THE TORQUE OF COMBUSTION ENGINES
Filed Dec. 10, 1937
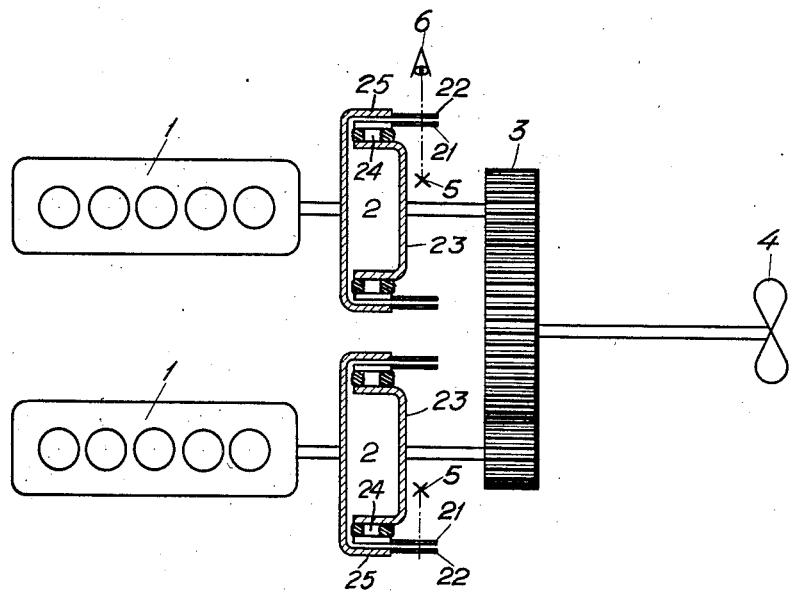
Inventor.
Nils Ericson Patented Feb. 16, 1943

2,311,331

UNITED STATES PATENT OFFICE 2,311,331

MEANS FOR MEASURING THE TORQUE OF COMBUSTION ENGINES

Nils Ericson, Stockholm, Sweden, assignor to Allmanna Svenska Elektriska Aktiebolaget, Vasteras, Sweden, a corporation of Sweden Application December 10, 1937, Serial No. 179,083
In Sweden March 1, 1937

7 Claims. (Cl. 265—25)

In combustion engines, especially for driving means of transport, it is often important to obtain a measure of the effective power in a simple manner. The present invention has for its object to provide a simple solution of this problem in the case where between the driving motor and the driving member proper of the means of transport, for instance the propelling screw of a ship, is interposed an electrodynamic slip coupling of the type in which magnetic poles on one coupling member cooperate with currents induced by the said poles in the other coupling member. In this case, supposing a constant field strength of the poles, the torque transmitted will within reasonable limits be practically proportional to the speed difference between the two coupling members and to the frequency of the induced currents. By measuring one of these quantities a measure of the transmitted torque can be obtained, and if the number of revolutions is also measured, a measure of the power is also obtained.

Generally it is most simple to measure the speed difference by means of a stroboscopical device, which has also the advantage that it can be used even if the induced currents consist of pure eddy currents.

A form of the invention is diagrammatically shown in the accompanying drawing.

I, I are a pair of combustion engines, 2, 2 the corresponding slip couplings, arranged for instance as described in my Patent No. 2,120,352, 3 a tooth gearing and 4 a ship propeller. On each member of each coupling there is arranged an annular screen 21, 22 respectively with a circular row of holes, preferably an equal number in both screens belonging to one coupling. Inside the inner screen is a fixed light source 5, and outside the outer screen is either the eye 6 of the observer or a screen to be illuminated. Each coupling consists, in the form shown and in a manner known per se, of an inner member 23 carrying D. C. excited magnet poles 24 and an outer conducting member 25 in which currents are induced by the said magnet poles when a slip occurs between the two members. Within reasonable limits, the value of this slip is proportional to induced currents and thus also to the torque transmitted by the coupling.

If the speed difference between the two coupling members amounts for instance to 3 revolutions per minute and the number of holes in each screen to 20, the light impression for the observer oscillates with the frequency of 60 per minute. By the aid of a simple table, the observer can easily determine the power also for a varying speed of the machine and varying pole strength, the table being for instance such that the time during which the light oscillations shall be counted is varied so as to obtain a direct measure of the engine power in tens or hundreds of horsepowers.

I claim as my invention:

1. Means for indicating the torque transmitted from a driving to a driven rotating element, comprising the combination of an electromagnetic slip coupling member connected to said driving element, another electromagnetic slip coupling member connected to said driven element, magnetic poles carried by one of said members, a conductor carried by the other member and in which currents are induced by said poles, and means for indicating the speed difference between the coupling members.

2. Means for indicating the torque transmitted from a driving to a driven rotating element, comprising the combination of an electromagnetic slip coupling member connected to said driving element, another electromagnetic slip coupling member connected to said driven element, magnetic poles carried by one of said members, a conductor carried by the other member and in which currents are induced by said poles, and stroboscopic means for indicating the speed difference between the coupling members.

3. Means for indicating the torque transmitted from a driving to a driven rotating element, comprising the combination of an electromagnetic slip coupling member connected to said driving element, another electromagnetic slip coupling member connected to said driven element, magnetic poles carried by one of said members, a conductor carried by the other member and in which currents are induced by said poles, screens arranged on both coupling members and having juxtaposed circular rows of holes, and a source of light producing a beam of light through said holes.

4. Means for indicating the torque transmitted from a combustion engine to an element driven thereby, comprising the combination of a combustion engine, an electromagnetic slip coupling member connected to said combustion engine, another electromagnetic slip coupling member connected to said driven element, magnetic poles carried by one of said members, a conductor carried by the other member and in which currents are induced by said poles, and means for indicating the speed difference between the coupling members.

5. In an electromagnetic slip coupling for the transmission of rotary motion, means for indicating the torque transmitted by the coupling, comprising means carried by the coupling members for visibly indicating the difference in their rotary speed and thus determining the torque transmitted.

6. In an electromagnetic slip coupling in which rotary motion is transmitted through the medium of magnetic poles and conductors in which currents are induced by said poles whereby the torque transmitted by the coupling is substantially proportional to the speed difference between the coupling members, stroboscopic means for indicating the speed difference of the two coupling members to determine the torque transmitted by the coupling.

7. In an electromagnetic slip coupling in which the torque transmitted is always substantially proportional to the difference in speed between two coupling members, torque indicating means comprising an annular member on each coupling member having a series of apertures and means for projecting light through the apertures of both series to indicate the said speed difference and the torque transmitted by the coupling.

NILS ERICSON.